3,842,084
BIS-(DIMETHYL-META-SULFONAMIDOPHENYL)-IMIDES OF PERYLENES

Fritz Graser, Ludwigshafen, Germany, assignor to Badische Anilin- & Soda-Fabrik Aktiengesellschaft, Ludwigshafen (Rhine), Germany
No Drawing. Filed Sept. 5, 1972, Ser. No. 286,609
Claims priority, application Germany, Sept. 21, 1971, P 21 47 024.6
Int. Cl. C07d 39/00
U.S. Cl. 260—281      1 Claim

ABSTRACT OF THE DISCLOSURE

Perylene-3,4,9,10-tetracarboxylic diimides of 1-aminophenyl-3-sulfonamides which bear alkyl and/or cycloalkyl as substituents in the sulfonamido group and which may bear a substituent in the phenyl nucleus. The dyes are eminently suitable for coloring plastics.

---

The invention relates to new dyes of the perylene-3,4,9,10-tetracarboxylic diimide series and to their production and their use for mass coloration of plastics.

The new dyes, which are bis-(m-sulfonamidophenyl)-imides of perylene-3,4,9,10-tetracarboxylic acid, have the formula (I):

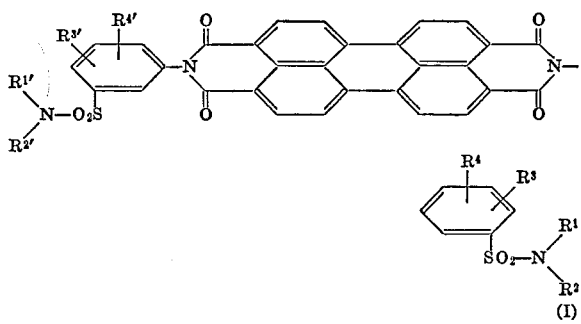

in which $R^1$ and $R^{1\prime}$ are alkyl of one to twelve carbon atoms or cycloalkyl of five to eight carbon atoms;
$R^2$ and $R^{2\prime}$ are hydrogen or alkyl of one to twelve carbon atoms;
$R^3$ and $R^{3\prime}$ are hydrogen, alkyl of one to three carbon atoms, chlorine or bromine; and
$R^4$ and $R^{4\prime}$ are hydrogen or alkyl of one to three carbon atoms; and in which
$R^1$ and $R^{1\prime}$, $R^2$ and $R^{2\prime}$, $R^3$ and $R^{3\prime}$ and $R^4$ and $R^{4\prime}$ may be identical or different.

Alkyl substituents of one to four carbon atoms such as methyl, ethyl, n-propyl, isopropyl, n-butyl or isobutyl are preferred as alkyl substituents for $R^1$, $R^{1\prime}$, $R^2$ and $R^{2\prime}$; other suitable alkyl substituents are pentyl, n-hexyl, isohexyl, n-octyl and 2-ethylhexyl.

Cyclopentyl, cyclooctyl and especially cyclohexyl are also suitable for $R^1$ and $R^{1\prime}$.

n-Propyl, isopropyl, ethyl and especially methyl are suitable as alkyl radicals for $R^3$ and $R^{3\prime}$.

$R^4$ and $R^{4\prime}$ are preferably hydrogen.

The dyes may be prepared by a conventional method by condensation of perylene-3,4,9,10 - tetracarboxylic acid or anhydride (which may contain from one to four halogen atoms as substituents) with an arylamine of the formula (II):

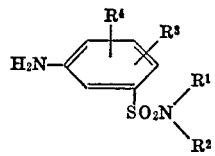

in which $R^1$, $R^2$, $R^3$ and $R^4$ have the meanings given above, in a ratio of 1:2 moles.

Examples of suitable arylamines of formula (II) are:

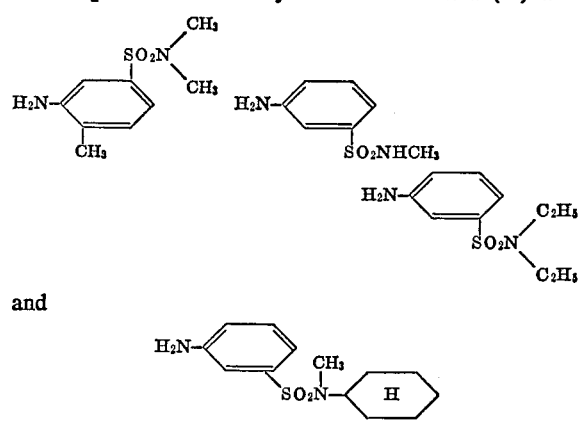

and

The condensation is advantageously carried out in a solvent or diluent which is inert under the reaction conditions such as quinoline, naphthalene or trichlorobenzene at elevated temperature, for example at a temperature of from 180° to 230° C. The reaction is advantageously carried out in the presence of an agent which accelerates the condensation, such as zinc chloride, zinc acetate, zinc propionate or hydrochloric acid (in the form of hydrochloride with the amine (II)). The arylamines (II) are conveniently used in excess. The condensation may also be carried out with a mixture of arylamines (II), unsymmetrical dyes of the formula (I) mixed with corresponding symmetrical dyes being obtained.

The dyes are isolated from the reaction mixtures by a conventional method by filtration. The dye is advantageously filtered at elevated temperature such as 80° to 120° C., with or without prior dilution of the reaction mixture with an inert solvent, for example an alcohol such as methanol, ethanol or isobutanol, a lower carboxamide such as formamide or an aromatic solvent such as toluene or chlorobenzene. In some cases the dyes obtained are fairly easily soluble and then they are conveniently filtered at lower temperature and a solvent in which they are less soluble, as for example an alcohol, is used for processing. The dye may be boiled with dilute caustic soda solution or sodium carbonate solution to remove any traces of perylenetetracarboxylic acid still present. The dyes may if necessary be further purified by dissolving them in sulfuric acid and reprecipitating them or by recrystallization.

Perylene-3,4,9,10 - tetracarboxylic - bisphenylimides which contain as the phenylimide group a radical of the formula:

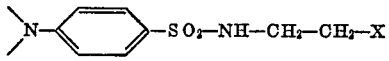

in which X is chlorine or —OSO₃H are disclosed in French Pat. 1,247,536. These dyes, which are intended for use as reactive vat dyes, are prepared from the bisphenylimides by reaction with chlorosulfonic acid followed by amidation. The sulfochloride group enters into the 4-position to the imide nitrogen during the sulfochlorination.

The new dyes are eminently suitable for mass coloring plastics, particularly thermoplastics. They give very clear bright orange shades which have an orange fluorescence, particularly in the case of transparent coloration. These dyes have good to very good light fastness in spite of the fluorescence. The dyes may also be used mixed with other dyes for coloring plastics.

Examples of thermoplastics are polyvinyl chloride, polyethylene, polypropylene, polycarbonates, polyacrylates and above all polystyrene and the copolymers of styrene with butadiene, acrylonitrile and/or acrylic esters. Thermosetting resins such as polyester resins and alkyd resins are also suitable for coloration. The dyes may also be used for coloring printing inks, distempers or paints of all types.

It is surprising that bright orange dyeings which fluoresce in a transparent coloration are obtained with the dyes of the invention because perylenetetracarboxylic bisarylimides such as the bisphenylimide, bis-p-chlorophenylimide, bis - 3,5 - dimethylphenylimide, bis - p - phenylazophenylimide and bis - p - ethoxyphenylimide produce in the plastics red colorations which do not exhibit any fluorescence and in some cases are very turbid. It is also suprising that the dyes according to the invention have substantially better solubility in organic solvents and in plastics than for example the abovementioned bisarylimides. Because of this better solubility a much better distribution of the new dyes in the plastics can be achieved so that special fine dispersion and finishing are not essential prior to use.

Moreover it is surprising that bis-(m-sulfonamidophenyl)-imides of perylene-3,4,9,10 - tetracarboxylic acid are very suitable for coloring plastics whereas the bis-(p-N,N-dimethylsulfonamidophenyl)imides and the bis-(p-N,N-diethylsulfonamidophenyl)-constitute insoluble pigments in plastics and solvents. These give bluish red shades in paints with only moderate light fastness. Only turbid red colorations are obtained with these p-compounds in coloring polystyrene.

The following Examples illustrate the invention. The parts and percentages specified are by weight.

EXAMPLE 1

8.0 parts of crystallized zinc acetate, 23.5 parts of perylene-3,4,9,10-tetracarboxylic acid and 28.2 parts of 2-methyl-5-N,N-dimethylsulfonamidoaniline are introduced into 170 parts of quinoline at 100° C. While a weak current of nitrogen is being passed over, the whole is heated to 225° to 230° C. and kept at this temperature until a processed sample no longer indicates any perylenetetracarboxylic acid when boiled up with dilute sodium carbonate solution. This is the case after about one hour to two hours. After cooling to about 100° C. the whole is filtered and the product is washed with quinoline, then with methanol and finally with water. The filtered material is stirred with about 250 parts of 2% aqueous sodium carbonate solution, heated to 95° C., filtered and washed until neutral. Any traces of perylenetetracarboxylic acid still present are thus removed. A very good yield of a dye is obtained which colors polystyrene very bright fluorescent orange shades having very good light fastness.

This fluorescent dye has the formula

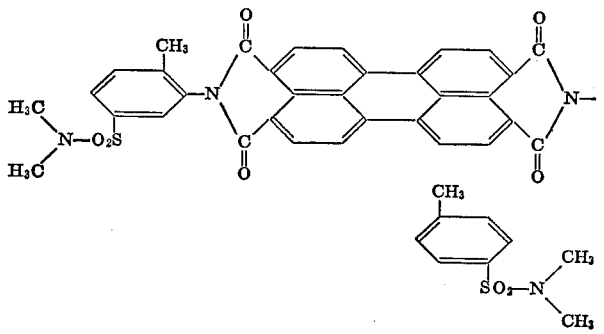

When the procedure described in Example 1 is followed but using x parts of the arylamines indicated in the table instead of the 28.2 parts of 2-methyl-5-N,N-dimethylsulfonamidoaniline, dyes which dye polystyrene very bright fluorescent orange shades having very good light fastness are obtained.

| Example number | Parts | Arylamine (II) |
|---|---|---|
| 2 | 35.2 | H₂N–C₆H₃–SO₂N(CH₃)–H |
| 3 | 30 | H₂N–C₆H₄–SO₂N(C₂H₅)–C₂H₅ |

EXAMPLE 4

The procedure described in Example 1 is followed but 25.4 parts of monochloroperylenetetracarboxylic anhydride is used instead of 23.5 parts of perylene-3, 4, 9, 10-tetracarboxylic acid.

Monochloroperylenetetracarboxylic acid or anhydride is prepared in the following way: 100 parts of perylenetetracarboxylic anhydride is heated in 700 parts of nitrobenzene with 12 parts of iodine and 390 parts of sulfuryl chloride to 65° to 70° C. and stirred at this temperature for two hours. The whole is heated further to 80° to 85° C. and kept at this temperature for seven hours. After cooling to room temperature the product is filtered off, washed with nitrobenzene, methanol and water and dried. A perylenetetracarboxylic anhydride having a chlorine content of 8.9% is obtained in a very good yield. This corresponds with a monochloroperylenetetracarboxylic anhydride.

EXAMPLE 5

0.05 part of the dye obtained according to Example 1 is mixed in a drum mixer with 100 parts of ground polystyrene block polymer in the dry state. The mixture is melted and homogenized in a screw extruder at a barrel temperature of from 200° to 250° C. The colored plastic material is granulated hot at the diehard or by drawing out threads and cooling and cutting the same. The granules obtained are then injection molded at 200° to 250° C. or pressed to give moldings of any desired shape. Bright orange moldings are obtained which fluoresce in similar shades having very good light fastness.

A polystyrene emulsion polymer or suspension polymer or a copolymer with butadiene and acrylonitrile or an acrylic ester may be used instead of the polystyrene block polymer.

Similar colorations are obtained with the dyes from Examples 2, 3 and 4.

EXAMPLE 6

0.2 part of the dye from Example 1 is mixed with 100 parts of ground polystyrene block polymer and 1 part of titanium dioxide as described in Example 5. The mixture is melted, homogenized and granulated. The granules obtained are injection or press molded into shaped articles (processing temperature 200° to 250° C.) Bright orange injection or press moldings are obtained with very good fastness properties.

Similar colorations are obtained with the dyes from Examples 2, 3 and 4.

EXAMPLE 7

(a) 30 parts of the dye obtainable according to Example 3 is dissolved at 0° to 5° C. in 600 parts of 96% sulfuric acid. Precipitation is then effected on a mixture of water and ice so that a temperature of 10° C. is not exceeded. After filtration and washing with water until neutral, an aqueous dye paste having a solids content of about 17% is obtained.

(b) 118 parts of the 17% dye paste obtained according to (a) is processed by flushing with 64 parts of a solvent-free alkyd resin modified with soya bean oil and 16 parts of bisethylhexyl phthalate on a three-roll mill with six passes at 60 atmospheres gauge to form a full color paste.

(c) 66 parts of binder (obtained by mixing 70 parts of solvent-free alkyd resin modified with soya bean oil, 17.5 parts of bisethylhexyl phthalate and 12.5 parts of a solvent-free melamine resin) is ground with 30 parts of titanium dioxide (rutile) and 4 parts of a colloidal silicon dioxide on a three-high mill at 60 atmospheres gauge with six passes to produce a titanium dioxide paste.

(d) 0.4 part of the full color paste prepared according to (b) and 5 parts of titanium dioxide paste prepared according to (c) are mixed and ground on a plate-type triturator. A surface coating is prepared with this dye paste and it is baked for forty-five minutes at 120° C. A clear red coloration is obtained.

EXAMPLE 8

1 part of the full color paste obtained according to Example 7(b) is mixed and ground on a plate-type triturator with 3 parts of a binder (obtained by mixing 70 parts of solvent-free alkyd resin modified with soya bean oil, 17.5 parts of bisethylhexyl phthalate and 12.5 parts of a solvent-free melamine resin). A surface coating is prepared with this dye paste and this is baked at 120° C. for forty-five minutes. A pure very transparent red coloration is obtained.

EXAMPLE 9

0.1 part of dye obtained according to Example 1 is homogenized with 100 parts of polyvinyl chloride powder (suspension or emulsion polymer) and 2 parts of dibutyl tin bisthioglycolic hexyl ester on mixing rolls at 140° to 150° C. for about eight minutes. The rolled sheet obtained is pressed into boards on a platen press at 140° C. and about 0.4 kg./cm.² Transparent bright orange moldings are obtained.

Moldings having similar colors are obtained by using the dye of Example 2, 3 or 4.

EXAMPLE 10

0.1 part of dye obtained according to Example 1 is homogenized as described in Example 8 with 100 parts of polyvinyl chloride powder (suspension or emulsion polymer), 1 part of titanium dioxide (rutile) and 2 parts of dibutyl tin bisthioglycolic hexyl ester on mixing rolls and press-molded into boards.

Similar colorations and similar properties are obtained when the dye of Example 2, 3 or 4 is used.

I claim:

1. The perylene-3, 4, 9, 10-tetracarboxylic diimide dye of the formula:

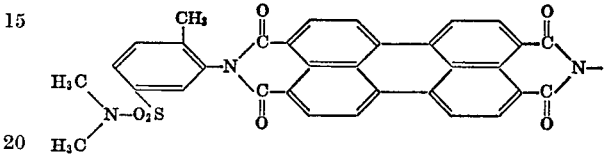

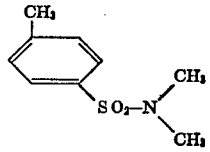

References Cited

UNITED STATES PATENTS

| | | | |
|---|---|---|---|
| 3,661,912 | 5/1972 | Kalz et al. | 260—281 |
| 3,006,882 | 10/1961 | Altermatt et al. | 260—37 NP |

FOREIGN PATENTS

| | | | |
|---|---|---|---|
| 224,782 | 12/1962 | Austria | 260—281 |
| 1,247,536 | 10/1960 | France | 260—281 |

DONALD G. DAUS, Primary Examiner

M. C. VAUGHN, Assistant Examiner

U.S. Cl. X.R.

106—288 Q; 260—37 N, 37 D, 345.2.